US006955792B2

(12) United States Patent
Filippi et al.

(10) Patent No.: US 6,955,792 B2
(45) Date of Patent: *Oct. 18, 2005

(54) PSEUDO ISOTHERMAL CATALYTIC REACTOR FOR EXOTHERMIC OR ENDOTHERMIC HETEROGENEOUS CHEMICAL REACTIONS

(75) Inventors: Ermanno Filippi, Castagnola (CH); Enrico Rizzi, Grandate (IT); Mirco Tarozzo, Ligornetto (CH)

(73) Assignee: Methanol Casale S.A., Lugano-Besso (CH)

( * ) Notice: Subject to any disclaimer, the term of this patent is extended or adjusted under 35 U.S.C. 154(b) by 551 days.

This patent is subject to a terminal disclaimer.

(21) Appl. No.: 10/035,293

(22) Filed: Jan. 4, 2002

(65) Prior Publication Data

US 2002/0088613 A1    Jul. 11, 2002

(30) Foreign Application Priority Data

Jan. 5, 2001    (EP) .................................. 01100363

(51) Int. Cl.⁷ ............................... B01J 8/02; B01J 8/04
(52) U.S. Cl. .................... 422/190; 422/198; 422/199; 422/202; 165/182
(58) Field of Search ............................. 422/198, 199, 422/190, 202; 165/182

(56) References Cited

U.S. PATENT DOCUMENTS

| 2,898,383 | A |   | 8/1959 | Douglas et al. |
| 3,666,423 | A |   | 5/1972 | Muenger |
| 3,796,547 | A |   | 3/1974 | Muenger |
| 3,958,629 | A |   | 5/1976 | Andersson |
| 3,982,901 | A |   | 9/1976 | Steever et al. |
| 4,594,227 | A |   | 6/1986 | Ohsaki et al. |
| 4,732,918 | A |   | 3/1988 | Lohmueller et al. |
| 5,405,586 | A | * | 4/1995 | Koves .................. 422/218 |
| 5,564,370 | A |   | 10/1996 | Giraud et al. |
| 5,986,146 | A | * | 11/1999 | Sioli .................... 568/472 |
| 2002/0018740 | A1 | * | 2/2002 | Filippi et al. ........... 422/198 |
| 2002/0085969 | A1 | * | 7/2002 | Filippi et al. ........... 422/200 |
| 2002/0117294 | A1 | * | 8/2002 | Filippi et al. ........... 165/170 |
| 2003/0175184 | A1 | * | 9/2003 | Filippi et al. ........... 422/198 |
| 2004/0071606 | A1 | * | 4/2004 | Filippi et al. ........... 422/126 |
| 2004/0204507 | A1 | * | 10/2004 | Filippi et al. ........... 518/726 |

FOREIGN PATENT DOCUMENTS

| DE | 197 23 977 A1 | 12/1998 |
| EP | 0 995 491 A1 | 4/2000 |

* cited by examiner

*Primary Examiner*—N. Bhat
(74) *Attorney, Agent, or Firm*—Sughrue Mion, PLLC

(57) ABSTRACT

Heat exchange unit for pseudo-isothermal reactors including a substantially cylindrical shell (2) closed at its opposite ends by respective bottoms (3, 4), at least one thereof is provided with at least one manhole opening (5) of predetermined dimensions, a reaction zone (6) inside the shell (2) in order to contain a catalytic bed, comprising at least two modular and assembly heat exchangers (11), having predetermined cross dimensions smaller than those of the manhole opening (5), each heat exchanger (11) comprising at least one heat exchange element (12).

18 Claims, 4 Drawing Sheets

PSEUDO ISOTHERMAL CATALYTIC REACTOR FOR EXOTHERMIC OR ENDOTHERMIC HETEROGENEOUS CHEMICAL REACTIONS

FIELD OF APPLICATION

In its broader aspect, the present invention relates to a pseudo-isothermal reactor for carrying out exothermic and endothermic heterogeneous reactions, comprising a substantially cylindrical shell closed at its opposite ends by respective bottoms, at least one thereof is provided with at least one manhole of predetermined dimensions, a reaction zone in the shell in order to contain a catalytic bed and a heat exchange unit placed in said reaction zone.

More in particular, this invention relates to a heat exchange unit for pseudo-isothermal reactors of the aforesaid type, which comprises at least one heat exchanger intended to be submerged in said catalytic bed.

PRIOR ART

As known, in order to carry out catalytic exothermic or endothermic reactions, chemical reactors, called adiabatic, have been largely used, that is to say, reactors in which the reaction occurs without any heat exchange and the reaction temperature increases or decreases according to said reaction being exothermic or endothermic.

Reactors of this type are economical and easy to construct in that they do not require the use of particular equipment and/or devices beside those normally provided for the construction and support of the catalytic bed.

However, for this kind of reactors a severe drawback is recognized, that is to say, when any control of the reaction temperature is required, for example in case the temperature has to be oscillating within a rather narrow range of values or, even, it has to be remaining constant at a predetermined value, it is not possible to intervene in any manner.

In order to overcome this drawback, particularly felt for strongly exothermic or endothermic reactions, adiabatic reactors have been designed in which the catalytic bed is split into a plurality of adiabatic stages, aligned along the reactor axis and separated by heat exchange systems or units.

Through these units a substantial re-alignment of the temperature of the gaseous reactants and of the reaction products exiting from each adiabatic stage at a predetermined value is allowed, and hence a certain control of the temperature of each single adiabatic stage. However, this does not allow, anyway, an optimal exploitation of the catalyst, because it operates far from the maximum reaction rate.

With the expression "maximum reaction rate", it is meant the reaction rate to which corresponds the maximum yield of the catalyst, so that, the conversion yield being the same, a minimum volume of catalyst is used.

A so called isothermal or pseudo-isothermal catalytic reactor has been therefore proposed, that is to say a reactor in which the reaction temperature is controlled by means of a suitable and continuous heat exchange realized within the catalytic bed. To this end, for the reactors of the aforesaid type, the use of large shell-and-tube exchangers submerged inside the catalyst, has been largely adopted. A suitable exchange fluid then traverses the tubes of the exchangers. As an alternative suggestion, it has been proposed to arrange the catalyst inside the tubes of a large tube bundle, impinged from outside by a selected heat exchange fluid.

Although advantageous under some aspects, in particular and above all that of a reaction carried out at an almost constant temperature, the pseudo-isothermal reactors proposed by the prior art have a relevant constructive complexity and further an additional recognized drawback, which will be explained hereinbelow, also shared by the adiabatic reactors even by a larger extent.

It is known that after a certain period of activity the reactors, in particular the adiabatic ones, must be completely scrapped, because of worn out or technologically obsolete internal equipment and devices, whereas they still have, for example, substantially sound and technologically valid outer shells.

Taken into account that in a catalytic reactor, whether adiabatic or pseudo-isothermal, it is recognized that the most expensive, the most valuable and appreciated part to be manufactured, from a technical and technological point of view, is the outer shell thereof, together with the respective closing bottoms, the requirement or better the desire exists of recovering and re-using the outer shell of a reactor, once its internals are at the end of their lifetime, by rendering it free of the existing equipment and re-equipping it with other new and more modern ones both from the structural and functional point of view.

Furthermore, as far as pseudo-isothermal reactors are concerned, the requirement is ever and ever felt of increasing the capacity, yield and efficiency of the existing reactors, so that the need exists of replacing the internal equipment already in use with technologically more improved ones.

In other words, it has always existed the need of revamping catalytic reactors of the aforesaid kind (both adiabatic and pseudo-isothermal), otherwise destined to a complete scrapping or anyway being not satisfying any more from the operating point of view, by transforming them advantageously in respective pseudo-isothermal reactors at high-efficiency.

However, this recovery or transformation has not been realized to now because, as a matter of common knowledge, it is of difficult, not economical and substantially impossible realization.

In fact, the equipment and the devices intended for replacing those worn out or obsolete contained in said reactor, such as, particularly, the heat exchange units of the type comprising a huge number of tubes supported by opposed large tube plates, forming an as large and complex tube bundle, have such a dimension that in order to place them inside a recovered shell, it would be needed, for example, the preliminary removal of at least one of the bottoms and then an arduous and difficult repositioning of the removed bottom, with the possible prejudice of the functionality and of the structural features of the reactor so obtained.

SUMMARY OF THE INVENTION

The technical problem underlying the present invention is that of obtaining a heat exchange unit for pseudo-isothermal catalytic reactors, having structural and functional features such to allow the aforesaid requirements to be fulfilled.

The aforesaid technical problem is solved according to the invention by a heat exchange unit for pseudo-isothermal reactors including a substantially cylindrical shell closed at its opposite ends by respective bottoms, at least one thereof is provided with at least one manhole of predetermined dimensions, a reaction zone inside the shell in order to contain a catalytic bed, characterized in that it comprises at least two modular and assembly heat exchangers, having predetermined cross dimensions smaller than those of the manhole opening, each heat exchanger comprising at least one heat exchange element, preferably comprising a pair of juxtaposed metallic plates, mutually adjoined in predetermined spaced relationship by means of welds, so as to define a gap of predetermined width between them.

The features and the advantages of a heat exchange unit according to the invention will become clearer from the following description of an indicative and not limiting example of an embodiment thereof provided with reference to the attached drawings.

DETAILED DESCRIPTION OF THE FIGURES

Figure 1:
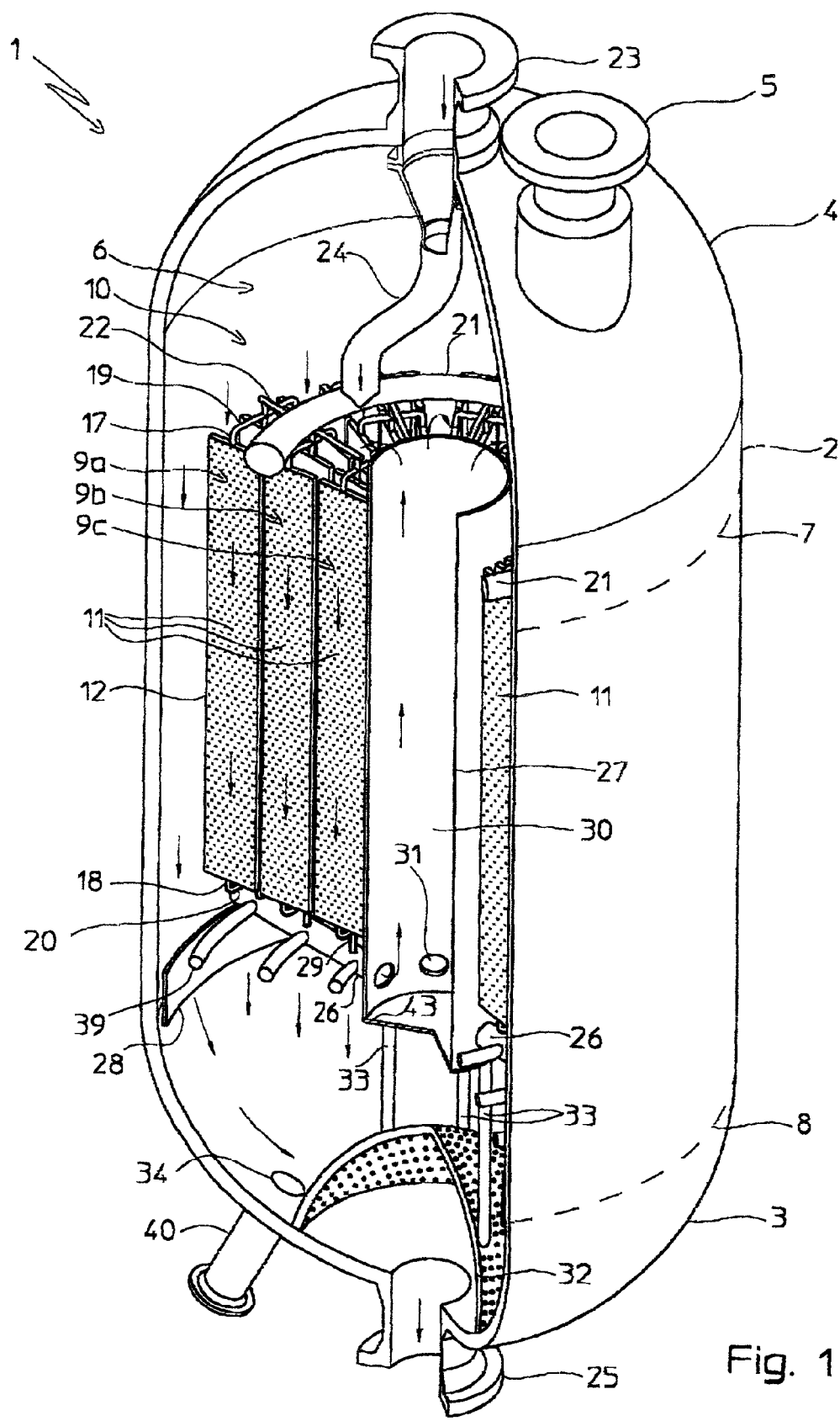
FIG. 1 shows schematically an axonometric view of a pseudo-isothermal reactor comprising a heat exchange unit according to the present invention.

With reference to the aforesaid figures, reference numeral 1 indicates in its whole and schematically a pseudo-isothermal reactor comprising a cylindrical shell 2, closed at its opposite ends by respective bottoms, lower 3 and upper 4.

The upper bottom 4 is provided with a so-called manhole opening 5 of predetermined cross dimensions.

Inside the shell 2 a reaction zone 6 is arranged, which in the figures is comprised between an upper line 7 and a lower line 8, in order to contain a catalytic bed, which is not described in detail as being per se known.

In the reaction zone 6 a heat exchange unit is supported, referred to in its whole with numeral 10, intended for being submerged in a volume of a suitable catalyst, not shown.

Said heat exchange unit 10 has a cylindrical shape having an outer diameter substantially equal to the inner diameter of said shell 2 and is axially crossed by a cylindrical passage 30, which preferably has a diameter large enough to be a manhole.

In the embodiment shown in FIG. 1, said heat exchange unit 10 comprises three pluralities 9a, 9b, 9c of heat exchangers 11, all having a cylindrical configuration, supported the one within the other, in an arrangement having coaxial and concentric elements.

According to the present invention, the exchangers 11 of each of said pluralities 9a, 9b, 9c of exchangers are advantageously modular and can be assembled and have predetermined cross dimensions, which are smaller than those of the manhole 5.

According to this embodiment, the exchangers 11 are further arranged distributed inside the reactor, having an orientation according to respective radial generating lines and supported in the manner described hereinafter.

Figure 2:
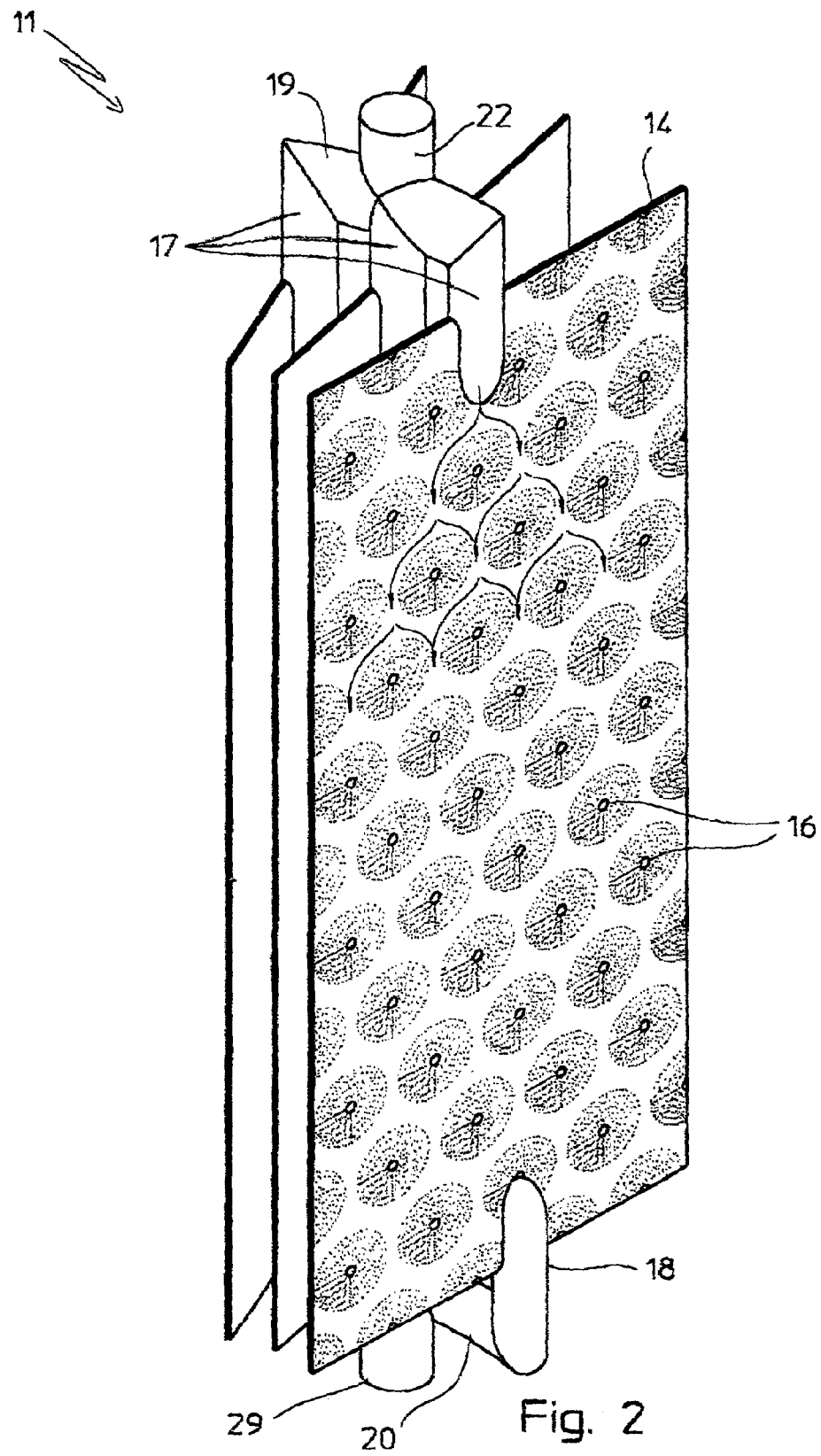
FIG. 2 shows schematically and in perspective enlarged view a detail of the heat exchange unit of FIG. 1.
Figure 3:
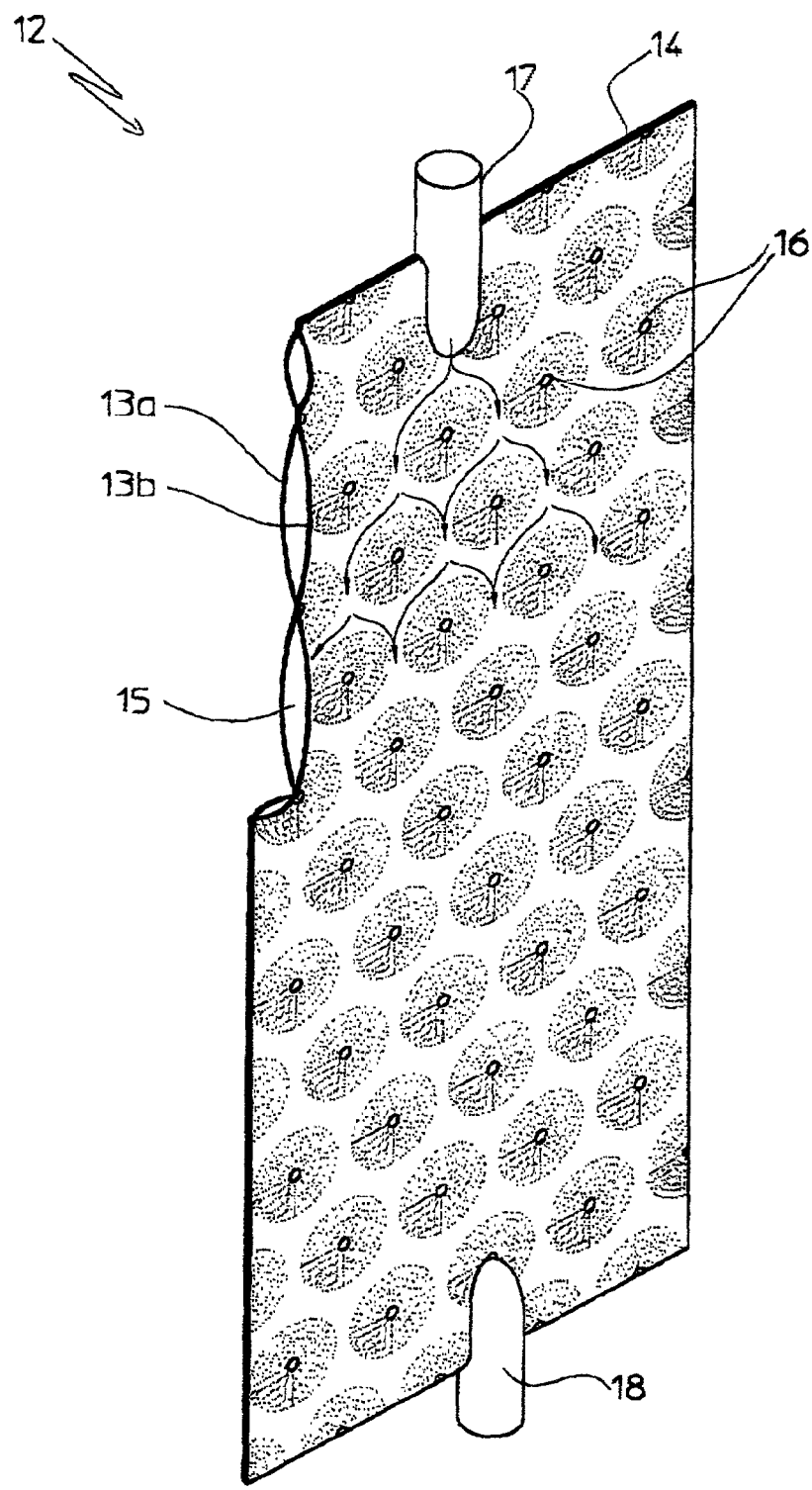
FIG. 3 shows schematically and in perspective enlarged view a detail of FIG. 2.

For sake of clarity of representation of the reactor of FIG. 1, each heat exchanger 11 is represented as comprising three heat exchange elements 12, represented in greater detail in FIGS. 2 and 3.

Preferably, each heat exchange element 12 has substantially the shape of a plate and is formed (FIG. 3) by a pair of juxtaposed metallic plates 13a, 13b, mutually adjoined in a predetermined spaced relationship by perimetrical welds 14. A gap 15 of predetermined width is than defined between said plates 13a, 13b, which is intended for being passed through by a heat exchange operating fluid.

In particular and according to a feature of the present invention, the plates 13a and 13b are mutually adjoined also by a plurality of welding spots 16, regularly distributed, preferably according to a so-called quincunx and/or square pitch, which provide the heat exchange element 12 with a substantially "quilted" aspect.

Each element 12 is provided, preferably on opposed sides, with inlet and outlet junctions 17, 18, respectively, for said heat exchange fluid.

It has to be noted that, because of the presence of the aforesaid welding spots 16, the passage of said fluid through the gap 15 of a heat exchange element 12 of the present invention occurs along tortuous paths, all in fluid communication between themselves and with the junctions 17, 18, respectively. These paths can continuously and randomly change, with a substantial contribution to the heat exchange efficiency of the exchangers 11 and hence to the optimization of the control of the reaction temperature.

The inlet and outlet junctions 17 and 18, respectively, of the heat exchange elements 12, are connected and fastened to upper and lower ducts 19, 20, respectively (FIG. 2), through which they are stiffened in a single structure so to form a corresponding exchanger 11.

All upper ducts 19 of all exchangers 11 of the pluralities 9a, 9b and 9c of exchangers are connected with a respective annular distributor duct 21, by means of a corresponding plurality of junction ducts generally indicated with numeral 22. This annular distributor is coaxial to the heat exchange unit 10 and supported thereon.

Advantageously said annular distributor 21, used for the inlet of a heat exchange fluid into the exchangers 11, comprises a plurality of curved portions, each of which is of dimensions such as to be adapted to pass through the aforesaid manhole 5.

The lower ducts 20 of the exchangers 11 are connected, through junctions 29, to respective manifolds 26 and 39.

The manifolds 26 are rectilinear and radially extended from the inner wall of said shell 2 up to said axial passage 30. The manifolds 39 are in turn formed as an arc of circle, all of them being concentric with respect to the axis of the shell 2, and extended between adjacent manifolds 26 with which they are in fluid communication.

The exchangers 11 of the pluralities 9a, 9b, 9c arranged inside the reactor aligned along a same radial generating line are arranged onto the radial manifolds 26. On the contrary, the other exchangers 11 are arranged onto the manifolds 39 (this last arrangement is not shown).

Advantageously and according to a preferred embodiment, the pluralities of manifolds 26 and 39 are used in order to form a substantially plane and grid-shaped structure, adapted to support the entire heat exchange unit 10, inside the shell 2. To this end, each manifold 26, suitably dimensioned, is fastened on one end onto an annular abutment 28 provided in the inner wall of the shell 2, at the lower end of the reaction zone 6, and on the other end to the wall of a central cylindrical duct 27, positioned and extending into the axial passage 30, of said heat exchange unit 10. The manifolds 39 are instead fastened at their ends to the manifolds 26. In FIG. 1, three manifolds 39 are shown, which are fastened at an end thereof to a manifold 26.

Advantageously, all the manifolds 26 and 39 are in fluid communication through openings 31 with said duct 27, towards which they convey the heat exchange fluid collected from the respective exchangers 11.

The annular distributor 21 and the manifolds 26 and 39 are in fluid communication with the outside of the reactor and, more in particular, the annular distributor 21 is in fluid communication with an inlet nozzle 23 by means of a feeding duct 24, whereas the manifolds 26 and 39 are in fluid communication with a nozzle 25.

The exchangers 11 are mounted and fastened in groups to the manifolds 26 and 39, only after having been inserted one-by-one into the shell 2, through the above mentioned manhole 5. A perforated protection element 32 entirely covers the nozzle 25.

The central duct 27 is supported inside the reactor by a plurality of supports 33 that lean onto the protection element 32 and, at the opposite end thereof, to the closing bottom 43 of the duct 27.

According to a further feature of the present invention, in the exchangers 11, the respective heat exchange elements 12 are arranged according to a mutual predetermined convergence, whereas inside the shell 2 and, more precisely, in the reaction zone 6, said exchangers 11 are advantageously positioned in such a way that the respective elements 12 are arranged according to a radial pattern (FIG. 1).

In the embodiment of FIG. 1, the heat exchange fluid that flows inside the exchangers 11 is formed by the gaseous reactants themselves that flow inside the central duct 27. The duct 27 is suitably intended for putting the junction 18 in fluid communication with the upper part of said reaction zone 6 by the openings 31. In fact, the reactants fed through the feeding duct 24 inside the heat exchange unit 10, as previously described, exit through respective outlet junctions 18 and are conveyed into the ducts 20 and the junctions 29 and then, through the radial manifolds 26, into the central duct 27.

From the ducts 27 the suitably heated or cooled gaseous reactants reach the reaction zone 6, they cross it for its entire length, and they exit the reactor 1 from the outlet nozzle 25.

The catalytic bed contained inside the zone 6 is supported by a granular layer of inert material. The aforesaid protection element 32 is arranged onto the bottom 3 in proximity of the nozzle 25 and allows the passage of the gases and at the same time it holds the grains of inert material.

Advantageously the lower bottom 3 of the shell is equipped with at least one opening 34 to which a respective nozzle 40 is connected for discharging the catalyst, once exhausted.

In particular, thanks to the presence of the openings 34 and of the nozzles 40, the discharge operation of the catalyst from the reactor 1 is extremely easy and quick, not requiring any more the time-consuming catalyst suction interventions from above according to the prior art.

Figure 4:
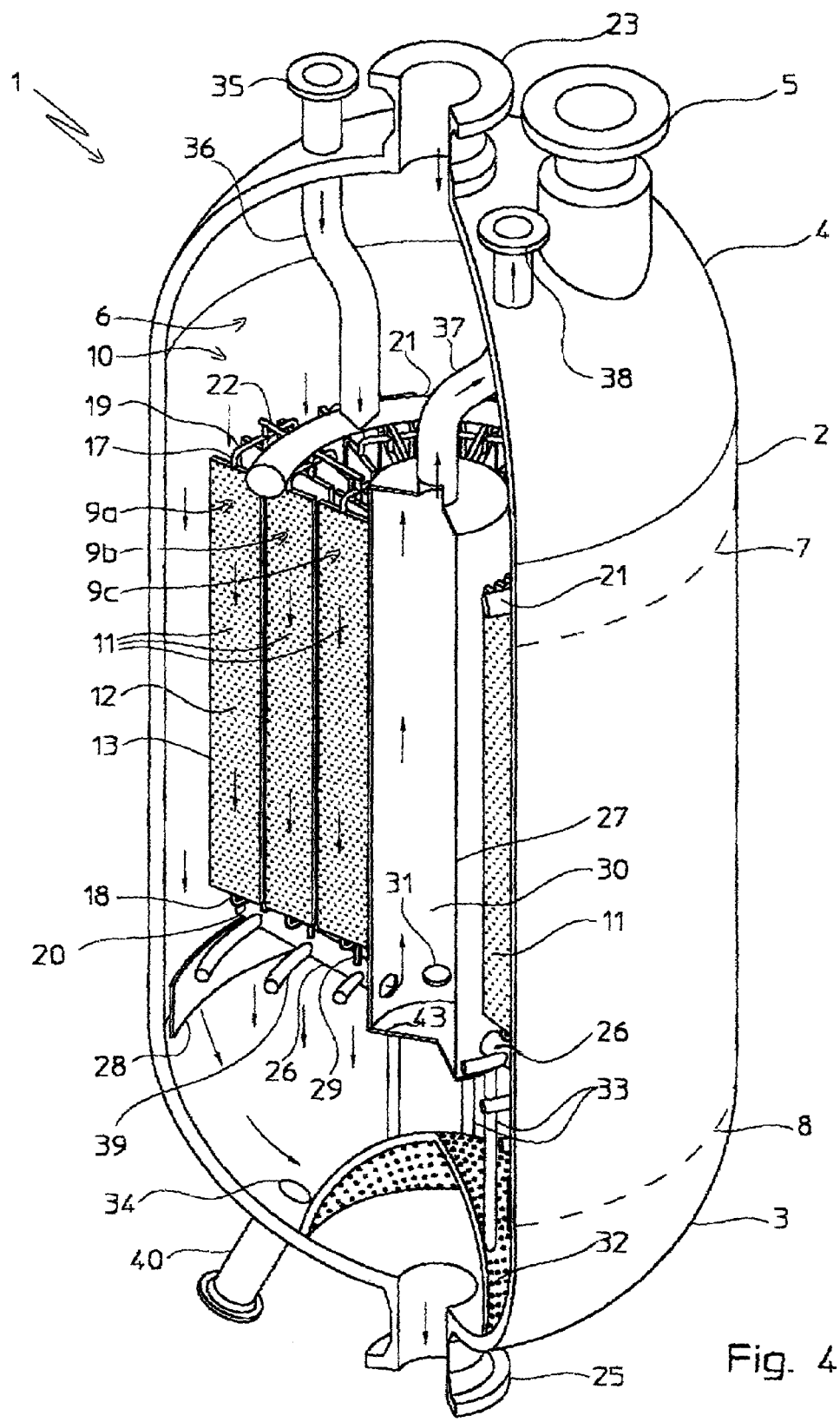
FIG. 4 shows schematically an axonometric view of a pseudo-isothermal reactor comprising a heat exchange unit according to an alternative embodiment of the present invention.

With reference to FIG. 4, the heat exchange fluid, which passes inside the exchangers 11 is a different fluid from the reacting fluid, such as water, water and steam or diathermic fluids. The heat exchange fluid is fed from an inlet nozzle 35 into a duct 36 and follows the fluid path from the annular distributor 21 to the central duct 27, already described in the foregoing. From the central duct 27, the heat exchange fluid exits the reactor by means of a suitable duct 37 and an outlet nozzle 38.

According to this alternative embodiment, the reactants are fed from the inlet nozzle 23 and after having passed through the reaction zone 6 for its entire length, exits from the reactor 1 through the outlet nozzle 25.

It has to be noted that the above described shell 2 can be designed ex novo or can consist of the shell of an already existing pseudo-isothermal reactor, that has been recovered upon removal of the internal equipment (revamping of a reactor intended for being scrapped). Or, the same can consist of the shell of an already existing adiabatic reactor, which also has been freed of the internal equipment (transformation of a reactor from adiabatic to pseudo-isothermal).

In fact, the exchangers 11 of the present invention can be easily inserted and mounted in order to replace each equipment removed from the inside of the recovered shell.

It has to be further noted that the heat exchange optimization reached in a reactor realized ex-novo with an exchange unit according to the present invention, it is also obtained in the above mentioned revamped and transformed reactors.

The number of elements 12 in each exchanger 11 can vary according to the cross dimensions of the manhole 5, of those of the single elements 12 as well as of the distance between the elements 12 of an exchanger 11.

Further on, in the same reactor exchangers 11 can also be present which comprise a different number of elements 12, as well as elements 12 of different dimensions.

The arrangement of the spots 16 in an element 12 can also be irregular, for example concentrated in some areas and absolutely absent in others.

The manifolds 39, shown in FIGS. 1 and 4 as an arc of circle, can be realized as a straight line, extending between adjacent manifolds 26, or according to a branched configuration. In the last case, the manifolds 39 extend both between manifolds 26 and manifolds 39 as well as between manifolds 26 and manifolds 29.

A not shown alternative embodiment of the reactor of FIG. 1, provides the feed of the reactants from the nozzle 23 to the central duct 27 by means of the feeding duct 24 suitably modified, in such a way that the heat exchange fluid, by passing through the openings 31, circulates inside the unit 10 from the junctions 29 towards the junctions 17, from which it exits in order to pass through the reaction zone 6 and to outflow from the nozzle 25.

Another alternative of use of the reactor of FIG. 4, provides the feeding of the cooling or heating fluid into the heat exchange unit 10 through the nozzle 38, the duct 37 and the central duct 27; the outflow of this fluid is hence carried out through the duct 36 and the nozzle 35.

In both said alternatives, the fluid inside the heat exchange unit 10 is directed counter current with respect to that in the reaction zone.

What is claimed is:

1. Heat exchange unit for pseudo-isothermal reactors including a substantially cylindrical shell (2) closed at its opposite ends by respective bottoms (3, 4), at least one thereof is provided with at least one manhole opening (5) of predetermined dimensions, a reaction zone (6) inside the shell (2) in order to contain a catalytic bed, characterized in that it comprises at least two modular and assembled heat exchangers (11), having predetermined cross dimensions smaller than those of the manhole opening (5), each heat exchanger (11) comprising at least one heat exchange element (12).

2. Heat exchange unit according to claim 1, characterized in that said at least one heat exchange element (12) comprises a pair of juxtaposed metallic plates (13a, 13b), mutually adjoined in predetermined spaced relationship by means of welds (14, 16), so as to define between them a gap (15) of predetermined width.

3. Heat exchange unit according to claim 2, characterized in that said plates (13a, 13b) are mutually adjoined by a plurality of welding spots (16) defining within the gap (15)

of respective heat exchange elements (12) a plurality of tortuous paths for an operating fluid, all in fluid communication with respective inlet and outlet junctions (17, 18) of said operating fluid, provided on opposed sides of said elements (12).

4. Heat exchange unit according to claim 3, characterized in that said welding spots (16) are distributed according to a quincunx and/or square pitch.

5. Heat exchange unit according to claim 3, characterized in that each exchanger (11) comprises a plurality of heat exchange elements (12), connected and stiffened in a single structure.

6. Heat exchange unit according to claim 5, characterized in that said junctions (17, 18) of said heat exchange elements (12), are connected and fastened to respective upper and lower ducts (19, 20).

7. Heat exchange unit according to claim 5, characterized in that the elements (12) are arranged within each exchanger (11) according to a radial pattern.

8. Heat exchange unit according to claim 6, characterized in that it comprises a plurality of manifolds (26, 39) in fluid communication with said lower ducts (20) and arranged so as to form a plane and grid-shaped structure, adapted to support said heat exchange unit (10), inside said shell (2).

9. Pseudo-isothermal reactor including a substantially cylindrical shell (2), closed at its opposed ends by respective bottoms (3, 4), at least one thereof is provided with at least one manhole opening (5) of predetermined dimensions, a reaction zone (6) within the shell (2) in order to contain a catalytic bed, characterized in that it comprises at least two modular and assembled heat exchangers (11), having predetermined cross dimensions smaller than those of said manhole opening (5), each heat exchanger (11) comprising at least one heat exchange element (12).

10. Reactor according to claim 9, characterized in that said at least one heat exchange element (12) comprises a pair of juxtaposed metallic plates (13a, 13b), mutually adjoined in a predetermined spaced relationship by welds (14, 16), so as to define between them a gap (15) of predetermined width.

11. Reactor according to claim 9, characterized in that it comprises a heat exchange unit (10) comprising said at least two exchangers (11), having a cylindrical configuration provided with an outer diameter equal to the inner diameter of said shell (2) and axially crossed by an axial passage (30), which has a diameter adapted to form a manhole.

12. Reactor according to claim 11, characterized in that it comprises a central duct (27), arranged and extending into said axial passage (30) of said heat exchange unit (10).

13. Reactor according to claim 11, characterized in that said heat exchange unit (10) comprises at least two pluralities (9a, 9b, 9c) of heat exchangers (11), all having a cylindrical configuration, supported the one within the other, wherein the elements are arranged coaxial and concentric between them.

14. Reactor according to claim 10, characterized in that said plates (13a, 13b) are mutually adjoined by a plurality of welding spots (16) defining inside the gap (15) of respective heat exchange elements (12), a plurality of tortuous paths for an operating fluid, all in fluid communication with respective inlet and outlet junctions (17, 18) of said operating fluid, provided on opposed sides of said elements (12).

15. Reactor according to claim 14, characterized in that each exchanger (11) comprises a plurality of heat exchange elements (12), connected and stiffened in a single structure.

16. Reactor according to claim 15, characterized in that said junctions (17, 18) of said heat exchange elements (12) are connected and fastened to respective upper and lower ducts (19, 20).

17. Reactor according to claim 15, characterized in that the heat exchange elements (12) are arranged within each heat exchanger (11) according to a radial pattern.

18. Reactor according to claim 16, characterized in that it comprises a plurality of manifolds (26, 39) in fluid communication with said lower ducts (20) and arranged so as to form a plane and grid-shaped structure, adapted to support said heat exchange unit (10) inside said shell (2).

* * * * *